United States Patent [19]
Aften et al.

[11] Patent Number: 5,099,923
[45] Date of Patent: Mar. 31, 1992

[54] CLAY STABILIZING METHOD FOR OIL AND GAS WELL TREATMENT

[75] Inventors: Carl W. Aften; Robert K. Gabel, both of Sugarland, Tex.

[73] Assignee: Nalco Chemical Company, Naperville, Ill.

[21] Appl. No.: 661,429

[22] Filed: Feb. 25, 1991

[51] Int. Cl.$^5$ .................................................. E21B 43/25
[52] U.S. Cl. ................................ 166/294; 166/305.1; 166/307; 166/308; 252/8.551; 252/8.553; 405/264
[58] Field of Search ............... 166/271, 275, 281, 294, 166/305.1, 307, 308; 106/900; 252/8.551, 8.553, 8.554; 405/264

[56] References Cited

U.S. PATENT DOCUMENTS

| | | | |
|---|---|---|---|
| 2,713,033 | 7/1955 | Cardwell et al. | 252/8.553 X |
| 2,761,835 | 9/1956 | Brown | 252/8.554 |
| 3,349,032 | 10/1967 | Krieg | 252/8.554 X |
| 3,412,019 | 12/1968 | Hoover et al. | 210/54 |
| 4,366,071 | 12/1982 | McLaughlin | 166/305.1 X |
| 4,366,074 | 12/1982 | McLaughlin et al. | 166/305.1 X |
| 4,462,718 | 7/1984 | McLaughlin et al. | 166/305.1 X |
| 4,526,693 | 7/1985 | Son et al. | 175/65 |
| 4,580,633 | 4/1986 | Watkins et al. | 166/295 |
| 4,703,803 | 11/1987 | Blumer | 166/307 X |
| 4,842,073 | 6/1989 | Himes et al. | 166/294 |

OTHER PUBLICATIONS

Sax, N. Irving et al, *Hawley's Condensed Chemical Dictionary*, eleventh edition, 1987, Van Nostrand Reinhold Comany, New York, p. 343.

*Primary Examiner*—George A. Suchfield
*Attorney, Agent, or Firm*—Daniel N. Lundeen; Robert A. Miller; Donald G. Epple

[57] ABSTRACT

A clay swelling inhibitor additive for oil and gas well treatment is disclosed. The additive comprises an aqueous solution of tetraalkylammonium chloride, preferably tetramethylammonium chloride and a quaternary amine-based cationic polyelectrolyte, such as methyl chloride quaternary salt of ethylene-ammonia condensation polymer. The additive composition synergistically retards water absorption by the down-hole clay formation.

10 Claims, 2 Drawing Sheets

CLAY STABILIZING METHOD FOR OIL AND GAS WELL TREATMENT

FIELD OF THE INVENTION

The present invention relates to a clay swelling inhibitor composition suitable for use in oil and gas well treatment, and more particularly to a clay swelling inhibitor composition comprising a tetraalkylammonium chloride and a quaternary amine-based cationic polyelectrolyte.

BACKGROUND OF THE INVENTION

Hydraulic fracturing has been utilized for may years to stimulate the production of oil, gas or other formation fluids from subterranean formations. In hydraulic fracturing, a suitable fluid is introduced into the down-hole formation by way of a well bore under conditions of flow rate and pressure which are at least sufficient to create or extend a fracture into a desired portion of the formation. Various fluids have been utilized in hydraulic fracturing, however, most fluids utilized today are aqueous-based liquids.

The presence of clay in an oil and gas producing formation poses a problem for production from wells completed in such formations. Ordinarily, such clays are inert in the formation and do not disrupt the flow of hydrocarbons. When disturbed, however, by aqueous-based fluids used in well stimulation, for example, clay particles can swell and reduce formation permeability.

Clay swelling problems in the past have been addressed by preflushing with slugs of salt-containing water and using inorganic salts in the aqueous stimulation fluids. Quite often the salt of choice has been potassium chloride (KCl) which converts the clay to a less swellable form by cation exchange with $Na^+$ ions present on the clay surfaces. Other salts include calcium chloride, ammonium chloride, and the like, typically dissolved in an aqueous preflush and/or in the aqueous stimulation fluid used for the formation treatment.

Clays dispersed throughout oil-producing formations may be described as stacked platelets with a net positive charge associated with the four short dimensional sides and a net negative charge with the two long dimensional faces. It is generally believed that the concept of surface charge may be used to understand the mechanisms involved in swelling inhibition. Since the large negatively charged surface is exposed to the surrounding solution, it attracts cations from the solution.

In order to inhibit the swelling phenomenon, minimization of the hydratable surface area of the clay is necessary. One way that this may be accomplished is by flocculating and decreasing the surface charge density, or by increasing the ionic strength of the aqueous phase, or both. By allowing cations with small charge-to-surface-area ratios to associate with the particle, the effective strength of the negatively charged, double-face platelet layer surfaces will be diminished, allowing greater platelet-platelet interaction. Increasing the ionic strength of the solution will also have the same effect.

In the case of KCl, it is generally believed that the potential for clay swelling is shunted via a cation exchange of potassium ions for the more hydration-enticing native cations, for instance, sodium. It has been found that $K^+$ is much better at creating electrostatic links between the negatively charged faces of the stacked clay platelets than the abundant $Na^+$, therefore allowing less osmotic migration of water to occur between the platelets. While a lower concentration of $K^+$ ions relative to $Na^+$ ions is needed to flocculate clays, $NH_4^+$ ions have been shown to be even better or equal to $K^+$ in creating electrostatic links and reducing osmotic migration of water.

While salts may be effective in protecting the formation, several problems are associated therewith: (1) the amount of material needed for preparing an effective fluid may be very high and it is often difficult to dissolve such solid components in the treating fluids in the quantities required; (2) in environmentally sensitive areas, there may be limits on the permissible amount of chloride; and (3) the presence of salts may interact with other additive components in the stimulation fluid, such as, for example, viscosifying agents, the hydration of which is inhibited by such salts. Accordingly, there is a need for a down-hole clay stabilizing composition which is inert to other down-hole fluid additives, low in chloride ion and therefore environmentally tolerable and which has greatly enhanced clay stabilizing effectiveness compared to KCl and other similar salts.

In U.S. Pat. No. 4,842,073 to Himes et al., there are disclosed formation control additives for utilization in stimulation fluids to minimize formation permeability damage as a result of formation contact by the stimulation fluid. The formation control additives disclosed include N-alkylpyridinium halides, N,N,N-trialkylphenolammonium halides, N,N,N-trialkylbenzylammonium halides, N,N,N-dialkylmorpholinium halides, and alkyl quaternary ammonium salts of two mole oligomers of epihalohydrin wherein the alkyl radical is selected from the group of methyl, ethyl, propyl and butyl radicals.

U.S. Pat. No. 4,526,693 to Son et al. disclosed a clay-based aqueous drilling fluid containing dissolved inorganic salts for use in drilling through either or both shale and salt formations. The fluid is prepared by dissolving quantities of ammonium chloride and sodium chloride in the aqueous fluid prior to mixing of the clay and other additives.

U.S. Pat. No. 4,580,633 to Watkins et al. discloses a method for treating a formation containing finely divided particulate material to increase the flow of fluids through the formation by first injecting an organic silicon compound in a hydrocarbon carrier fluid, followed by an injection of steam containing a compound which contains ammoniacal nitrogen selected from the group consisting of ammonium hydroxide, ammonium salts of inorganic acids, ammonium salts of carboxylic acids, quaternary ammonium halides, amine or substituted amine hydrochlorides, derivatives of ammonium cyanate and water-soluble ammonia or ammonium ion precursors selected from the group of amides of carbamic acid and thiocarbamic acid, derivatives of such amides, tertiary carboxylic acid amides and their substituted and alkylated derivatives. A preferred nitrogen-containing compound is said to be urea.

In U.S. Pat. No. 3,412,019 to Hoover et al., there is disclosed a method for flocculating suspended matter in an aqueous media with polymers comprising repeating units derived from diallylamine and quaternary ammonium monomers containing groups condensed through a Michael addition reaction from a vinyl type activated double bond compound.

U.S. Pat. No. 3,797,574 to Feuerbacher et al. discloses a process for recovering petroleum from a subterranean formation by flooding with a surfactant which is inhibited from absorption by treating the formation with a pre-flush slug of a water soluble quaternary ammonium salt prior to injecting the surfactant.

Other references disclosing ammonium and/or alkali metal salts in various down-hole fluids include U.S. Pat. Nos. 3,089,874; 4,371,443; 3,882,029; 3,873,452; 3,707,192; 3,543,857; 2,713,033; and 4,572,296.

SUMMARY OF THE INVENTION

It has been discovered that a combination of a water soluble tetraalkylammonium chloride (TAAC) and a quaternary amine-based cationic polyelectrolyte ("quat") in an aqueous solution are effective to inhibit clay swelling in a down-hole formation, and can be used to treat and/or pretreat a down-hole formation for well stimulation, e.g. fracing, acid treating, and the like. The degree of inhibition of clay swelling achieved by the combination of the TAAC and the quat is, quite surprisingly, greater than an additive effect of each component alone, and truly synergistic.

Broadly, the present invention provides a composition suitable as an additive for inhibiting clay swelling in a down-hole formation. The composition comprises an aqueous solution of tetraalkylammonium chloride and a quaternary amine-based cationic polyelectrolyte. In a preferred embodiment, the TAAC comprises from about 10 to about 60 percent by weight of the aqueous solution, especially from about 20 to about 50 percent by weight, and the quat comprises from about 1 to about 20 percent by weight, especially from about 2 to about 10 percent by weight. The quat preferably has a molecular weight of from about 10,000 to about 50,000 daltons.

In another aspect, the present invention provides a well stimulation fluid comprising a tetraalkylammonium chloride, a quaternary amine-based cationic polyelectrolyte and a viscosifying agent. In a preferred embodiment the well stimulation fluid comprises from about 1.25 to about 30 pounds, preferably from about 2.5 to about 15 pounds of the TAAC, preferably, tetramethylammonium chloride (TMAC), and from about 0.3 to about 10 pounds, preferably from about 0.6 to about 5 pounds of the quat, per thousand gallons of the well stimulation fluid.

In a further aspect, the present invention provides a method for stabilizing a clay-containing formation. The method includes the step of contacting the formation with a well stimulation fluid comprising TAAC and quat. The method may include the steps of preparing the well stimulation fluid by blending the aforesaid additive composition in the well stimulation fluid, at from about 1.25 to about 30 pounds, preferably from about 2.5 to about 15 pounds TAAC, preferably TMAC, and from about 0.3 to about 10 pounds, preferably from about 0.6 to about 5 pounds of quat per thousand gallons of the stimulation fluid.

DETAILED DESCRIPTION OF THE INVENTION

Figure 1:
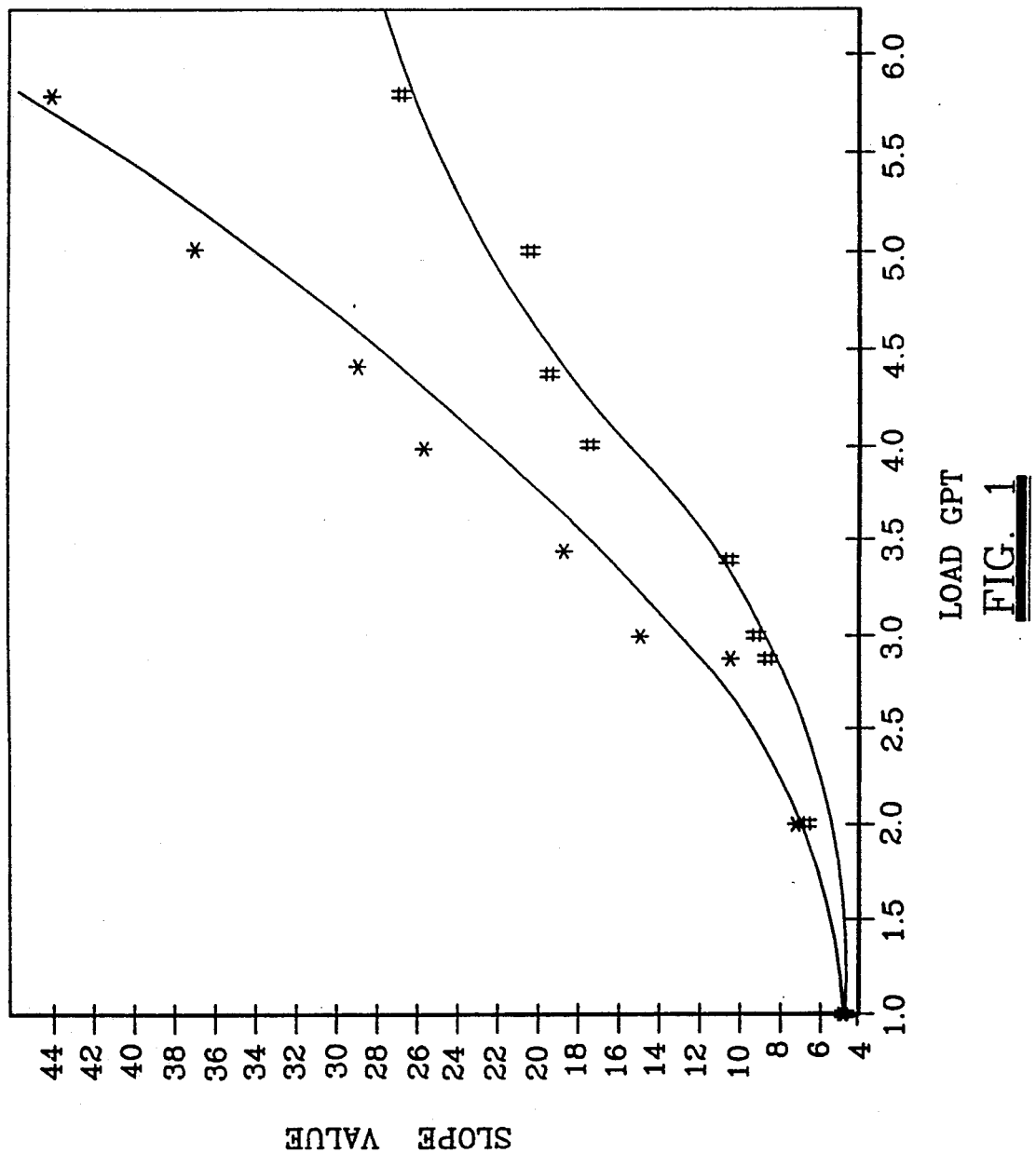
FIG. 1 is a graphical illustration of the synergistic effects of TMAC and quat in inhibiting clay swelling in an aqueous solution according to the present invention (*-*-*) compared to the sum of the individual components (--) by plotting slope (ml leaked off/(time)$^{\frac{1}{2}}$) versus inhibitor concentration (gallons per thousand gallons solution).

It has been discovered that a tetraalkylammonium chloride (TAAC) and a quaternary amine-based cationic polymer ("quat" or "polyelectrolyte") synergistically interact in aqueous solution to inhibit clay swelling. The two agents cooperate to reduce clay platelet surface charge area and thereby retard the osmotic tendency of the clay to swell. The TAAC provides cation exchange which is akin to ammonium chloride, but with greater hydrophobicity. It is believed that hydrophobicity of quaternized groups further decreases the osmotic aqueous influx between the platelets. The alkyl substituent creates a hydrophobic sphere around the ion, decreasing the likelihood of water immigration between the platelets when they are aggregated, and sealing them from water influx. If the hydrocarbon chains are not too large, an effective chain length may be realized which even further increases the effective sphere of hydrophobicity, provided that steric effects are not too great to override the free energy of mixing. Alkyl chains therefore, may actually seek each other out to form a linked hydrophobic network associated with the surface of the clay. The ionic strength of the solution is increased by the presence of TAAC, and also by the quat. The polyelectrolyte, since it is cationic and carries a positive charge, will also associate with the negatively charged platelet surface.

The first component of the stabilizing additive of the present invention is the tetraalkylammonium chloride (TAAC) wherein the alkyl radicals may be independently methyl, propyl, butyl, etc. up to about $C_{20}$. The TAAC must generally be water soluble. TAAC having longer alkyl groups can generally provide better hydrophobicity and sealing characteristics, but are more expensive and less soluble in water. Hydrophobic activity and water solubility may be balanced by utilizing TAAC compounds employing one to three short alkyl groups and one to three longer alkyl groups. The short alkyl groups include alkyl radicals having from 1 to about 4 carbon atoms and the long alkyl groups include alkyl radicals having from about 5 to about 20 carbon atoms. Representative examples of such preferred TAAC compounds include dimethyl-distearylammonium chloride, dimethyldioleylammonium chloride, dimethyl-ditallowammonium chloride, trimethylhexadecylammonium chloride, tricapryl-methylammonium chloride, tridodecylmethylammonium chloride, and the like. Another preferred tetraalkylammonium chloride is tetramethylammonium chloride (TMAC) because of its economy and commercial availability. TAAC comprises from about 10 to about 60 percent by weight of the aqueous composition, preferably from about 20 to about 50 percent by weight of the aqueous composition.

The second component of the stabilizing additive comprises a water-soluble quaternary amine-based cationic polyelectrolyte. By "water soluble" it is meant that the polyelectrolytes are soluble or dispersible in the TAAC solution at an effective concentration. The polyelectrolyte preferably has a molecular weight sufficiently high so that it has low volatility, but on the other hand, the molecular weight should not be so high that the polyelectrolyte is water insoluble. The weight average molecular weight of the polyelectrolyte is from about 5000 to about 250,000 daltons, preferably from about 10,000 to about 100,000 and more preferably from about 10,000 to about 50,000 daltons. Representative polyelectrolytes include, for example:

(a) the quaternized salts of polymers of N-alkylsubstituted aminoalkyl esters of acrylic acids including, for example, poly(diethylaminoethylacrylate) acetate, poly(diethylaminoethyl-methyl acrylate) and the like;

(b) the quaternized salt of reaction products of a polyamine and an acrylate type compound prepared, for example, from methyl acrylate and ethylenediamine;

(c) polymers of (methacryloyloxyethyl)trimethyl ammonium;

(d) copolymers of acrylamide and quaternary ammonium compounds such as acrylamide and diallylmethyl($\beta$-propionamido)ammonium chloride, acrylamide($\beta$-methacryloyloxyethyl)trimethylammonium methyl sulfate, and the like;

(e) quaternized vinyllactam-acrylamide co-polymers;

(f) the quaternized salt of hydroxy-containing polyesters of unsaturated carboxylic acids such as poly-2-hydroxy-3-(methacryloxy)propyltrimethylammonium chloride;

(g) the quaternary ammonium salt of polyimide-amines prepared as the reaction product of styrene-maleic anhydride copolymer and 3-dimethylaminopropylamine;

(h) quaternized polyamines;

(i) the quaternized reaction products of amines and polyesters;

(j) the quaternized salt of condensation polymers of polyethyleneamines with dichloroethane;

(k) the quaternized condensation products of polyalkylene-polyamines and epoxy halides;

(l) the quaternized condensation products of alkylene-polyamines and polyfunctional halohydrins;

(m) the quaternized condensation products of alkylene-polyamines and halohydrins;

(n) the quaternized condensation polymer of ammonia and halohydrin;

(o) the quaternized salt of polyvinylbenzyltrialkylamines such as, for example, polyvinylbenzyltrimethylammonium chloride;

(p) quaternized salt of polymers of vinyl-heterocyclic monomers having a ring N such as poly(1,2-dimethyl-5-vinylpyridinium methyl sulfate), poly(2-vinyl-2-imidazolinium chloride) and the like;

(q) polydialkyldiallylammonium salt including polydiallyldimethylammonium chloride (polyDADMAC);

(r) copolymers of vinyl unsaturated acids, esters and amides thereof and diallyldialkylammonium salts including polymethacrylamidopropyltrimethylammonium chloride (polyMAPTAC), poly(acrylic acid-diallyl-dimethylammonium chloride-hydroxypropylacrylate) (polyAADADMAC-HPA);

(s) the quaternary salt of ammonia-ethylene dichloride condensation polymers.

Preferred polyelectrolytes include polyDADMAC, polyMAPTAC, polyAADADMAC-HPA and the methyl chloride quaternary salt of ethylene dichlorideammonia condensation polymers. The aforementioned polyelectrolytes used in the additive of the present invention are well known and are available under various trade designations. PolyDADMAC, for example, is available under the tradename AGEFLOC WT-40 which is a 40 percent by weight aqueous solution. As another example, the methyl chloride quaternary salt of ethylene dichloride-ammonia condensation polymer (20% active, about 20,000 $M_w$) is available from Nalco Chemical under the trade name ASP-425.

The clay stabilizing additive comprises the active cationic electrolytic polymer component in an amount of from about 1 to about 20 percent by weight of the additive, preferably from about 2 to about 10 percent by weight of the additive.

To prepare the clay stabilizing fluid additive, the TAAC salt tetramethyl ammonium chloride (TMAC), for example, may be synthesized in situ from the reaction product of trimethylamine (TMA) and methyl chloride (MC). Alternatively, off-the-shelf components may be simply blended together in an agitated vessel in an aqueous solution. When TMAC is prepared from the reaction of MC and TMA, the polyelectrolyte may be admixed into the reaction effluent after cooling. Preferably, the polyelectrolyte is dissolved into the aqueous diluent prior to the reaction of the trimethylamine and methyl chloride, and in this manner it is possible to use the same equipment for preparation of the quat and TAAC since the quat will not generally interfere with the TMA/MC reaction.

A stimulation fluid is preferably prepared by admixing a quantity of the clay stabilizing additive composition of the present invention and a polymeric viscosifying agent with an aqueous liquid. Alternatively, the stimulation fluid may be prepared by blending together the various components, viz. TAAC, quat and viscosifier, in the desired proportion in any combination or order.

Typically, the viscosifying agent is a soluble polysaccharide. Representative examples of soluble polysaccharides include galactomannan gums (guar), glucomannan gums, cellulose derivatives, and the like. The stimulation fluid generally comprises viscosifying agent in a concentration of about 100 to about 600 pounds per 1000 gallons.

The stimulation fluid may carry conventional suspended proppants such as glass beads which are forced into the fracture or fractures to keep the broken formation from closing completely once the pressure is released. However, the use of such proppants is not necessary to achieve the clay stabilization obtained by the present simulation fluid.

The stimulating fluid also may include a crosslinking agent for the viscosifying agent as well as other conventional additives. For example, the fluid can contain bactericides, breakers, iron control agents, foaming agents such as surfactants, gases or liquified gases, stabilizers, and the like. The preparation of such fluids and the various additives are well known in the art. The selection of the particular stimulating fluid constituents such as the viscosifying agent, crosslinking agent, breakers, stabilizers and the like is not critical to the successful operation of the present invention.

The clay swelling inhibitor additive is admixed with an aqueous stimulation fluid in an amount sufficient to substantially stabilize the formation against permeability damage as the result of contact with the aqueous stimulation fluid. The additive solution is preferably admixed with the stimulation fluid in an amount of at least about 0.5 pounds of TAAC per 1000 gallons, more preferably from about 1.25 to about 30 pounds per 1000 gallons, and especially from about 2.5 to about 15 pounds per 1000 gallons. The stimulation fluid obtained thereby preferably has at least about 0.1 pounds of quat per 1000 gallons of the stimulation fluid, more preferably from about 0.3 to 10 pounds per 1000 gallons, and especially from about 0.6 to about 5 pounds per 1000 gallons.

The clay swelling inhibitor additive is available in a liquid state, in contradistinction to KCl and similar salts which are crystalline solids, and may be readily admixed with the stimulation fluid at any time prior to contact of the fluid with the down-hole formation. Alternatively, the present additive may be admixed with constituents of the liquid viscosifying agent and stored as a ready-to-use stimulation fluid additive concentrate.

The clay swelling inhibitor additive is effective in treating a down-hole formation when transported in a carrier fluid such as a well-stimulation fluid having either an acid, alkaline or neutral pH. The stimulation fluid of the present invention may have a pH in the range of from about 1 to about 11 without any significant negative effects upon the activity thereof.

The present invention may be further illustrated by the following examples:

EXAMPLE 1

In a stainless steel or HASTELLOY metal reaction vessel rated for at least for 80 psig service and equipped with an agitation means and a cooling means, methyl chloride is controllably added to an aqueous solution of triethylamine in the presence of ASP-425 polyelectrolyte and heated to 55° C. The temperature is preferably maintained at 55° C. by a cooling water jacket and the rate of methyl chloride addition is adjusted so that reaction pressure preferably does not exceed 55 psig. The reaction is initially allowed to continue for about 1.5 hours or until the pH has preferably reached from about 6.5 to about 8. The extent of remaining amine reactant is analytically determined by gas chromatography, for example. If excess amine is present, the pH of the effluent is raised to a level of from about 10 to about 12 by addition of a base such as 50 weight percent NaOH and a stoichiometric amount of additional methyl chloride is added. The reaction is allowed to continue at 55° C. for an additional 0.5 hour. When the amount of residual amine is within desired specifications, pH is preferably adjusted to from about 6.5 to about 8 and the reaction effluent is cooled. The final composition is 40 percent by weight TMAC, and 20 percent by weight ASP-425.

EXAMPLE 2

Tests were conducted in a laboratory to determine the effectiveness of the additive of the present invention as a clay-swelling inhibitor. The experimental procedure followed and equipment utilized is well known in the art of servicing oil wells. Briefly, the procedure measured the amount of water not absorbed in a 4 weight percent bentonite slurry in fresh water with the inhibitor present. Any free water present is water not absorbed by the swelled clay particles. The greater the amount of free water liberated in the test procedure by the slurry, the greater the clay-swelling inhibition by the additive tested.

Initially, varying concentrations and compositions of the clay swelling inhibitor additive were prepared in tap water. Next, 250 ml of the inhibitor-containing solution was placed into a Waring blender set at 30 volts on a 140 V Variac. Then 10 g of oven-dried bentonite was added to the blending solution and the speed was increased to 100 V. The mixture was agitated in this manner for 5 min. In a low pressure fluid-loss measuring cell equipped with hardened filter paper equivalent to Waltman #50, the mud slurry was poured with stirring to prevent phase separation. Initially, a trial run was made at ambient pressure and the amount of fluid liberated after 5 min was recorded. In successive trials, the cell lid was secured and pressure raised to 26 psig. Fluid not absorbed was measured and recorded cumulatively at 1, 3, 5 and 10 minute intervals. These data were plotted against (time)$^{\frac{1}{2}}$ and a slope value was calculated for each set of trials in units of ml/(time)$^{\frac{1}{2}}$. Larger slope values corresponded to enhanced swelling inhibition. Synergism of the present invention composition may be seen in FIG. 1 (tabulated in Table 1).

TABLE 1

| Composition$^a$ (lb/1000 gal) | | | TMAC (lb/ 1000 gal) | Slope (1) | Quat (lb/ 1000 gal) | Slope (2) | Slope Σ (1 + 2) |
|---|---|---|---|---|---|---|---|
| TMAC | Quat | Slope | | | | | |
| 3.5 | 0.35 | 5.0 | 3.5 | 1.8 | 0.35 | 3.1 | 4.9 |
| 7.0 | 0.70 | 7.2 | 7.0 | 3.2 | 0.70 | 3.6 | 6.8 |
| 9.6 | 0.96 | 10.2 | 9.6 | 4.4 | 0.96 | 4.0 | 8.4 |
| 10.4 | 1.04 | 14.8 | 10.4 | 5.0 | 1.04 | 4.3 | 9.3 |
| 11.8 | 1.18 | 18.4 | 11.8 | 5.8 | 1.18 | 4.5 | 10.3 |
| 13.9 | 1.39 | 25.9 | 13.9 | 12.6 | 1.39 | 5.0 | 17.6 |
| 15.0 | 1.50 | 28.7 | 15.0 | 14.4 | 1.50 | 5.2 | 19.6 |
| 17.4 | 1.74 | 37.0 | 17.4 | 14.8 | 1.74 | 5.4 | 20.2 |
| 19.9 | 1.99 | 44.0 | 19.9 | 20.7 | 1.99 | 5.8 | 26.5 |

$^a$gallons per 1000 gallon loading composition in FIG. 1 converted to lb per 1000 gallon loading each component.

COMPARATIVE EXAMPLE 1

The TMAC component of the present invention was tested individually for clay swelling inhibition activity in the apparatus and by procedures described in Example 2. From results appearing in FIG. 2 (tabulated in Table 2), it can be seen that TMAC has greatly superior activity in comparison to prior art KCl.

TABLE 2$^a$

| TMAC (g/l) | Slope (ml/min) | KCl (g/l) | Slope (ml/min) |
|---|---|---|---|
| 0.7 | 3.4 | 9.8 | 6.7 |
| 1.5 | 7.7 | 15.2 | 10.4 |
| 2.6 | 33.6 | 19.7 | 15.2 |
| 3.3 | 46 | 30.4 | 27.5 |
| | | 50.4 | 37 |
| | | 70.4 | 40.6 |
| | | 100.2 | 43.5 |

Figure 2:
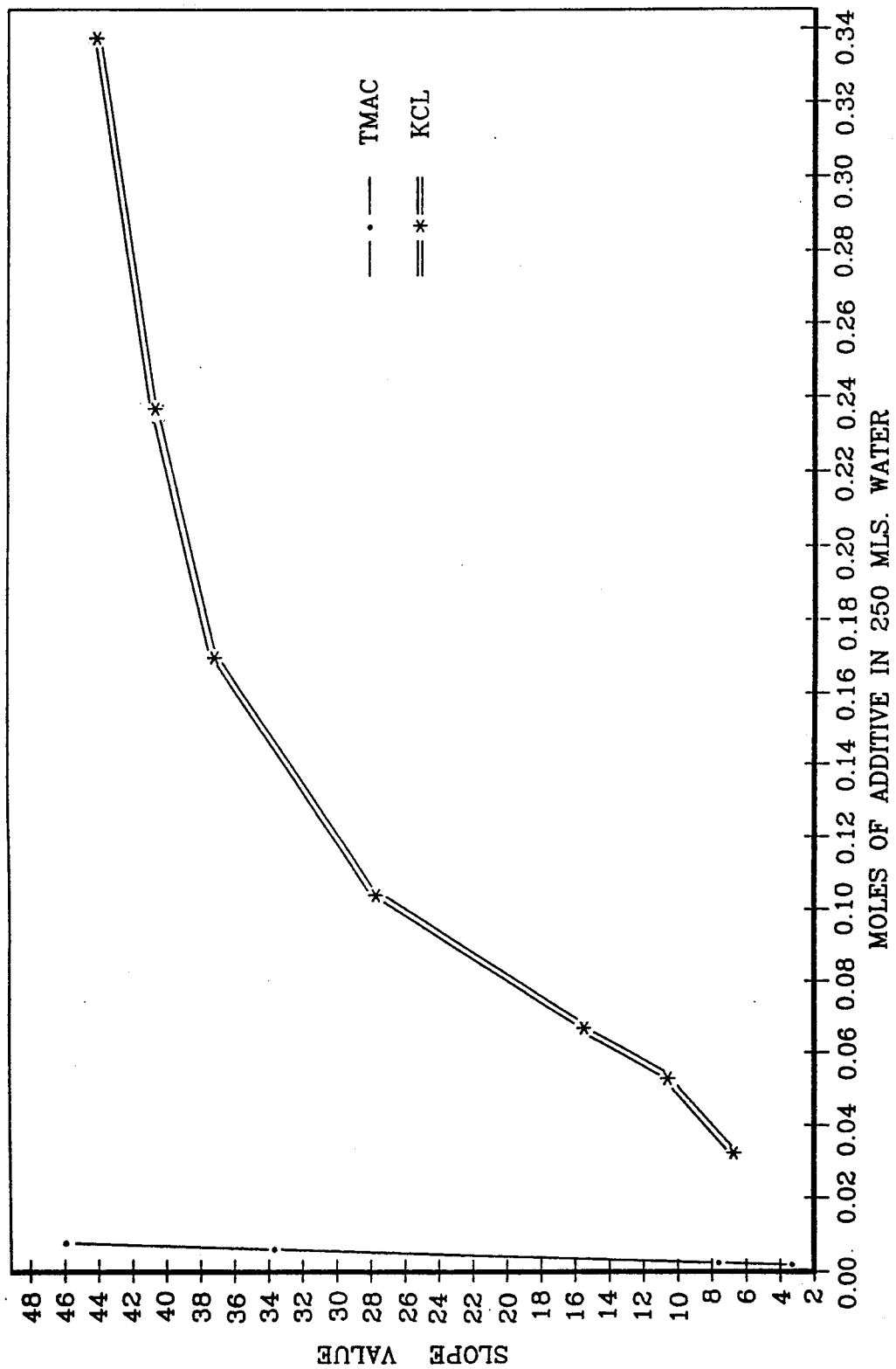
FIG. 2 is a graphical illustration comparing the swelling inhibition action of 40% by weight aqueous solution TMAC (•-•-•) versus 2% by weight aqueous solution KCl (*=*=*) by plotting slope (ml leaked off/min) versus inhibitor concentration (moles per 250 ml solution).

$^a$moles per 250 ml in FIG. 2 converted to g/l.

The foregoing description of the invention is illustrative and explanatory thereof. Various changes in the materials, apparatus, and particular parts employed will occur to those skilled in the art. It is intended that all such variations within the scope and spirit of the appended claims be embraced thereby.

What is claimed is:

1. A method for stabilizing a clay-containing formation for down-hole well stimulation, comprising the step of contacting the formation with a stimulation fluid, comprising:
   (a) tetraalkylammonium chloride; and
   (b) a quaternary amine-based cationic polyelectrolyte.

2. The method of claim 1, wherein said tetraalkylammonium chloride comprises from about 1.25 to about 30 pounds per 1000 gallons of said stimulation fluid.

3. The method of claim 1, wherein said tetraalkylammonium chloride comprises from about 2.5 to about 15 pounds per 1000 gallons of said stimulation fluid.

4. The method of claim 1, wherein said polyelectrolyte comprises from about 0.3 to about 10 pounds per 1000 gallons of said stimulation fluid.

5. The method of claim 1, wherein said polyelectrolyte comprises from about 0.6 to about 5 pounds per 1000 gallons of said stimulation fluid.

6. The method of claim 1, wherein said polyelectrolyte is selected from a group consisting of poly(diallyldimethylammonium chloride), poly(methacrylamidopropyltriminethylammonium chloride), poly(acrylic aciddiallyldimethylammonium chloride-hydroxypropylacrylate) and a methyl chloride quaternary salt of ethylene dichloride-ammonia condensation polymer.

7. The method of claim 1, wherein said polyelectrolyte has a molecular weight of from about 10,000 to about 50,000 daltons.

8. The method of claim 1, wherein said tetraalkylammonium chloride comprises tetramethylammonium chloride.

9. The method of claim 1, wherein said tetraalkylammonium chloride has from 1 to 3 short alkyl groups and from 1 to 3 long alkyl groups.

10. The method of claim 9, wherein said short alkyl groups comprise from 1 to about 4 carbon atoms and said long alkyl groups comprise about 5 to about 20 carbon atoms.

* * * * *